(12) United States Patent
Lew et al.

(10) Patent No.: US 10,913,659 B1
(45) Date of Patent: Feb. 9, 2021

(54) MOLECULAR SIEVE SSZ-114, ITS SYNTHESIS AND USE

(71) Applicant: CHEVRON U.S.A. INC., San Ramon, CA (US)

(72) Inventors: Christopher Michael Lew, Alameda, CA (US); Stacey Ian Zones, San Francisco, CA (US); Dan Xie, El Cerrito, CA (US); Howard Steven Lacheen, Richmond, CA (US); Tao Wei, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/908,804

(22) Filed: Jun. 23, 2020

Related U.S. Application Data

(60) Provisional application No. 62/906,193, filed on Sep. 26, 2019.

(51) Int. Cl.
| | |
|---|---|
| *C01B 39/48* | (2006.01) |
| *C01B 39/06* | (2006.01) |
| *B01J 29/04* | (2006.01) |
| *B01J 29/70* | (2006.01) |
| *C01B 39/02* | (2006.01) |

(52) U.S. Cl.
CPC ............ *C01B 39/06* (2013.01); *B01J 29/047* (2013.01); *B01J 29/70* (2013.01); *C01B 39/026* (2013.01)

(58) Field of Classification Search
CPC ...... C01B 39/026; C01B 39/48; B01J 29/047; B01J 29/70
See application file for complete search history.

(56) References Cited

U.S. PATENT DOCUMENTS

| | | | |
|---|---|---|---|
| 10,155,666 B2 | 12/2018 | Zones | |
| 10,293,330 B2 | 5/2019 | Schmidt et al. | |
| 10,821,461 B2* | 11/2020 | Turczak | ............... F04B 13/02 |
| 2017/0252729 A1 | 9/2017 | Schmidt et al. | |
| 2020/0330973 A1* | 10/2020 | Lew | .................. B01J 29/047 |

OTHER PUBLICATIONS

Hernández-Rivera et al, "Using Similarity Metrics to Quantify Differences in High-Throughput Data Sets: Application to X-ray Diffraction Patterns", ACS Comb. Sci. 2017, 19, 1, 25-36 Publication Date:Dec. 1, 2016 https://doi.org/10.1021/acscombsci.6b00142 (Year: 2017).*

(Continued)

*Primary Examiner* — David M Brunsman

(57) ABSTRACT

A novel synthetic crystalline aluminogermanosilicate molecular sieve material, designated SSZ-114, is provided. SSZ-114 can be synthesized by treating an aluminogermanosilicate molecular sieve of CTH framework topology with water or an aqueous solution of a mineral acid under conditions sufficient to degermanate at least a portion of aluminogermanosilicate molecular sieve to form a degermanated molecular sieve and calcining the degermanated molecular sieve under conditions sufficient to convert the degermanated molecular sieve to SSZ-114. Molecular sieve SSZ-114 may be used in organic compound conversion reactions and/or sorptive processes.

9 Claims, 1 Drawing Sheet

(56) References Cited

OTHER PUBLICATIONS

Holder et al, "Tutorial on Powder X-ray Diffraction for Characterizing Nanoscale Materials", ACS Nano 2019, 13, 7, 7359-7365 Publication Date:Jul. 23, 2019 https://doi.org/10.1021/acsnano.9b05157 (Year: 2019).*

Kang et al, "Transformation of Extra-Large Pore Germanosilicate CIT-13 Molecular Sieve into Extra-Large Pore CIT-5 Molecular Sieve" Chem. Mater. 2019, 31, 23, 9777-9787 Publication Date:Nov. 6, 2019 https://doi.org/10.1021/acs.chemmater.9b03675 (Year: 2019).*

Zhang et al, "Selective Recovery and Recycling of Germanium for the Design of Sustainable Zeolite Catalysts", ACS Sustainable Chem. Eng. 2020, 8, 22, 8235-8246 Publication Date:May 8, 2020 htttps://doi.org/10.1021/acssuschemeng.0c01336 (Year: 2020).*

Search Strategy performed Nov. 23, 2020 (Year: 2020).*

P. Eliasova, M. Opanasenko, P.S. Wheatley, M. Shamzhy, M. Mazur, P. Nachtigall, W.J. Roth, R.E. Morris and J. Cejka "The ADOR mechanism for the synthesis of new zeolites" Chem. Soc. Rev. 2015, 44, 7177-7206.

D.S. Firth, S.A. Morris, P.S. Wheatley, S.E. Russell, A.M.Z. Slawin, D.M. Dawson, A. Mayoral, M. Opanasenko, M. Polozij, J. Cejka, P. Nachtigall and R.E. Morris "Assembly—Disassembly—Organization—Reassembly Synthesis of Zeolites Based on cfi-Type Layers" Chem. Mater. 2017, 29, 5605-5611.

S.E. Henkelis, M. Mazur, C.M. Rice, G.P.M. Bignami, P.S. Wheatley, S.E Ashbrook, J. Cejka and R.E. Morris "A procedure for identifying possible products in the assembly—disassembly—organization—reassembly (ADOR) synthesis of zeolites" Nature Protocols 2019, 14, 781-794.

X. Liu, W. Mao, J.Jiang, X. Lu, M. Peng, H. Xu, L. Han, S. Che and P. Wu "Topotactic Conversion of Alkali-Treated Intergrown Germanosilicate CIT-13 into Single-Crystalline ECNU-21 Zeolite as Shape-Selective Catalyst for Ethylene Oxide Hydration" Chem. Eur. J. 2019, 25, 4520-4529.

\* cited by examiner

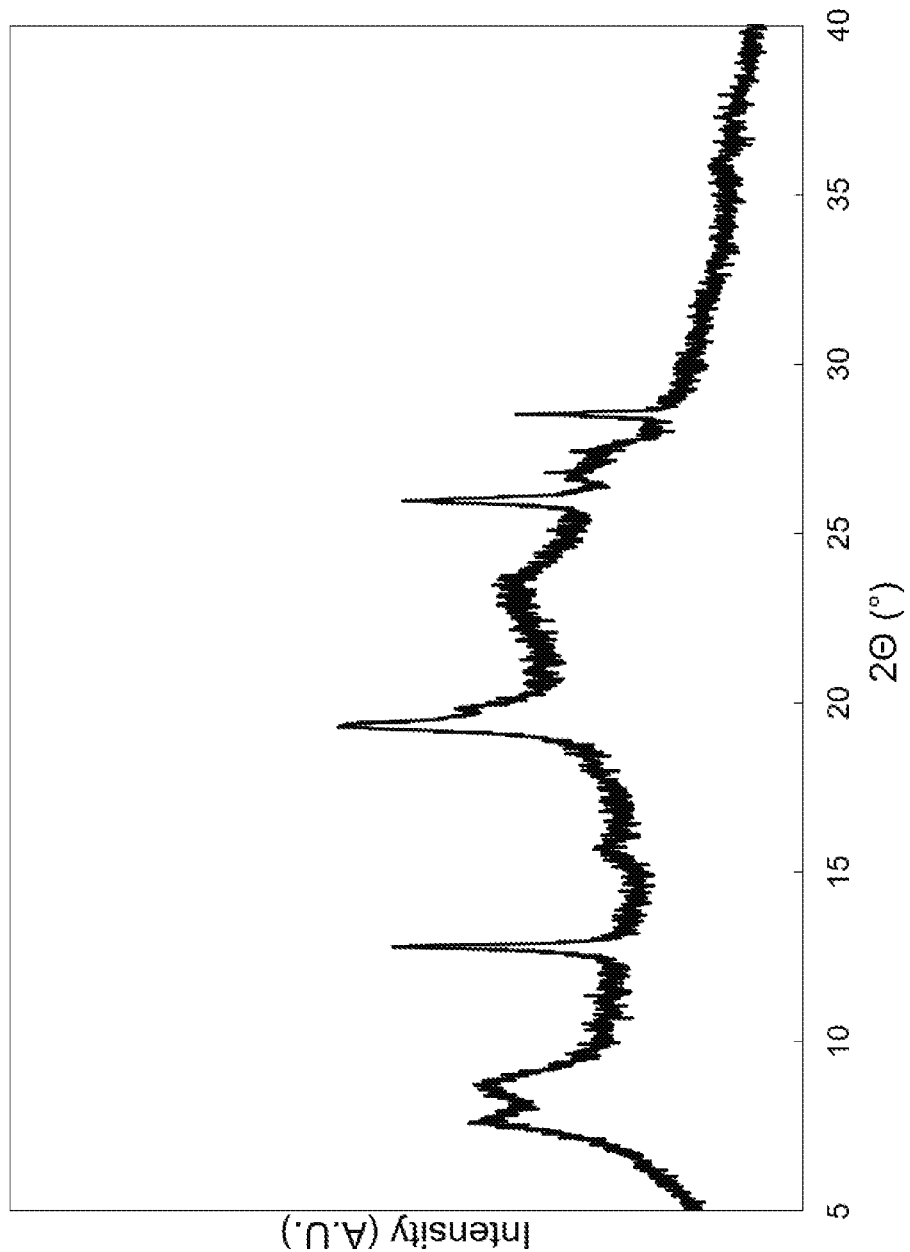

US 10,913,659 B1

MOLECULAR SIEVE SSZ-114, ITS SYNTHESIS AND USE

CROSS-REFERENCE TO RELATED APPLICATIONS

This application claims priority to and the benefit of U.S. Provisional Application Ser. No. 62/906,193, filed Sep. 26, 2019.

FIELD

This disclosure relates to a novel synthetic crystalline molecular sieve designated SSZ-114, its synthesis, and its use in organic compound conversion reactions and/or sorptive processes.

BACKGROUND

Molecular sieves are a commercially important class of materials that have distinct crystal structures with defined pore structures that are shown by distinct X-ray diffraction (XRD) patterns. The crystal structure defines cavities and channels/pores that are characteristic of the specific type of molecular sieve: this is usually described as the framework type or topological type.

According to the present disclosure, a new crystalline molecular sieve, designated SSZ-114 and having a unique powder X-ray diffraction pattern, has now been synthesized.

SUMMARY

In first aspect, there is provided an aluminogermanosilicate molecular sieve having, in its calcined form, a powder X-ray diffraction as shown in FIG. 1.

In its calcined form, the molecular sieve can have a chemical composition, in terms of molar ratios, as follows:

|  | Broadest | Secondary |
|---|---|---|
| $SiO_2/Al_2O_3$ | ≥10 | 50 to 5000 |
| $SiO_2/GeO_2$ | 20 to 100 | 25 to 50 |

In a second aspect, there is provided a method of synthesizing the molecular sieve described herein, the method comprising (a) providing an first aluminogermanosilicate molecular sieve, the first aluminosilicate molecular sieve having a CTH framework topology; (b) treating the first aluminogermanosilicate molecular sieve with water or an aqueous solution of a mineral acid under conditions sufficient to degermanate at least a portion of the first aluminogermanosilicate molecular sieve to form a degermanated molecular sieve; and (c) calcining the degermanated molecular sieve under conditions sufficient to convert the degermanated molecular sieve to a second aluminogermanosilicate molecular sieve, the second aluminogermanosilicate molecular sieve having, in its calcined form, a powder X-ray diffraction pattern as shown in FIG. 1.

In a third aspect, there is provided a process of converting a feedstock comprising an organic compound to a conversion product which comprises contacting the feedstock at organic compound conversion conditions with a catalyst comprising an aluminogermanosilicate molecular sieve having, in its calcined form, a powder X-ray diffraction pattern as shown in FIG. 1.

BRIEF DESCRIPTION OF THE DRAWINGS

FIG. 1 shows the powder X-ray diffraction pattern of the calcined SSZ-114 molecular sieve product of Example 1.

DETAILED DESCRIPTION

Introduction

The term "aluminogermanosilicate" refers to a crystalline microporous solid containing aluminum, germanium and silicon oxides within its framework structure. The aluminogermanosilicate may be a "pure aluminogermanosilicate" (i.e., absent other detectable metal oxides) or optionally substituted. When described as "optionally substituted", the respective framework may contain other atoms (e.g., boron, gallium, indium, iron, tin, titanium, zinc, zirconium) substituted for one or more of the atoms not already contained in the parent framework.

The term "framework topology" and its preceding three-letter framework code refers to the framework type data provided for the framework code by the Structure Commission of the International Zeolite Association.

The term "degermanate" refers to a process whereby at least a portion of the germanium atoms contained in a molecular sieve framework is removed.

Molar ratios of $SiO_2/Al_2O_3$ and $SiO_2/GeO_2$ were determined by Inductively Coupled Plasma (ICP) elemental analysis.

Micropore volume, surface area and pore width were determined based on argon adsorption isotherm at 87.5 K (−186° C.) recorded on ASAP 2010 equipment from Micromeritics. The sample was first degassed at 400° C. for 16 hours prior to argon adsorption. The low-pressure dose was 2.00 cm$^3$/g (STP). A maximum of one hour equilibration time per dose was used and the total run time was 37 hours. The argon adsorption isotherm was analyzed using the density function theory (DFT) formalism and parameters developed for activated carbon slits by J. P. Olivier (*J. Porous Mater.* 1995, 2, 9-17) using the Saito-Foley adaptation of the Horvarth-Kawazoe formalism (*Micropor. Mater.* 1995, 3, 531-542) and the conventional t-plot method (*J. Catal.* 1965, 4, 319-323).

Brønsted acidity was determined by n-propylamine temperature-programmed desorption (TPD) adapted from the published descriptions by T. J. Gricus Kofke et al. (*J. Catal.* 1988, 114, 34-45); T. J. Gricus Kofke et al. (*J. Catal.* 1989, 115, 265-272); J. G. Tittensor et al. (*J. Catal.* 1992, 138, 714-720). Samples were pre-treated at 400° C.-500° C. for 1 hour in flowing dry H$_2$. The dehydrated samples are then cooled down to 120° C. in flowing dry helium and held at 120° C. for 30 minutes in a flowing helium saturated with n-propylamine for adsorption. The isopropylamine-saturated samples are then heated up to 500° C. at a rate of 10° C./min in flowing dry helium. The Brønsted acidity is calculated based on the weight loss vs. temperature by TGA and effluent NH$_3$ and propene by mass spectrometry.

Constraint Index (CI) is a convenient measure of the extent to which an aluminosilicate or other molecular sieve provides controlled access to molecules of varying sizes to its internal structure. Materials which provide a highly restricted access to and egress from its internal structure have a high value for the Constraint Index, and materials of this kind usually have pores of small size. On the other hand, materials which provide relatively free access to the internal zeolite structure have a low value for the Constraint Index, and usually have pores of large size. The methods by which Constraint Index can be determined are described fully by V.

J. Frillette et al. (*J. Catal.* 1981, 67, 218-222) and S. I. Zones et al. (*Micropor. Mesopor. Mater.* 2000, 35-36, 31-46). Materials exhibiting a Constraint Index value within the range of greater than about 12 are considered to be of small pore size. Materials exhibiting a Constraint Index value within the range of from about 1 to about 12 are considered to be of intermediate pore size. Materials exhibiting a Constraint Index value within the range of less than about 1 are considered to be of large pore size. Small pore materials generally have a pore size of from about 3 Å to less than 5.0 Å. Intermediate pore materials generally have a pore size of from about 5.0 Å to less than 7 Å. Large pore materials generally have a pore size of at least 7 Å.

Synthesis of Molecular Sieve SSZ-114

Molecular sieve SSZ-114 can be synthesized by (a) providing a first aluminogermanosilicate molecular sieve, the first aluminosilicate molecular sieve having a CTH framework topology; (b) treating the first aluminogermanosilicate molecular sieve with water or an aqueous solution of a mineral acid under conditions sufficient to degermanate at least a portion of the first aluminogermanosilicate molecular sieve to form a degermanated molecular sieve; and (c) calcining the degermanated molecular sieve under conditions sufficient to convert the degermanated molecular sieve to a second aluminogermanosilicate molecular sieve, the second aluminogermanosilicate molecular sieve having, in its calcined form, a powder X-ray diffraction pattern as shown in FIG. 1.

Step (a)

Molecular sieves of CTH framework type, such as germanosilicate CIT-13, possess a three-dimensional framework with intersecting 14- and 10-ring pores, wherein an n-ring represents the number of tetrahedral atoms defining the size of a channel. More specifically, the molecular sieve framework can be described in terms of dense layers, similar to those found in the CIT-5 (CFI) framework structure ("cfi-layers") connected via germania-rich double 4-ring (d4r) units to form a two-dimensional channel system delimited by 14- and 10-ring pore openings between the layers. The term "germania-rich" refers to an aluminogermanosilicate composition having sufficient germania to favor a delamination (e.g., via degermanation) such as described below. Generally, such delaminations can occur with germanosilicates of CTH topology where the molar ratio of $SiO_2/GeO_2$ is less than about 5.68, 5.4, 5, 4.4, or 4.35. When used in the context of the d4r composite building unit (e.g., germania-rich d4r units), the germania content is much higher, and the $SiO_2/GeO_2$ molar ratios can approach or be practically zero (i.e., these units are practically entirely germania).

There are no specific restrictions how the aluminogermanosilicate molecular sieve having CTH framework topology is provided. The molecular sieve may be either purchased from a commercial source or prepared according to a suitable synthetic process known in the art. The molecular sieve may be provided in the form a powder or in the form of a spray powder or a spray granulate. The molecular sieve provided can be substantially devoid of organic structure directing agents (e.g., the molecular sieve has been calcined or otherwise treated in a manner so as to remove remnants of the organic structuring agent from the as-synthesized CTH material), wherein "substantially" as employed herein with respect to the amount of one or more organic structure directing agents contained in the CTH framework type molecular sieve indicates an amount of 0.1 wt. % or less of one or more organic structure directing agents (e.g., 0.05 wt. % or less, or 0.001 wt. % or less, or 0.0005 wt. % or less).

One example of an aluminogermanosilicate molecular sieve having CTH framework topology is aluminogermanosilicate CIT-13 (Al-CIT-13). Methods for preparing Al-CIT-13 are known in the art and are described, for example, in U.S. Pat. No. 10,155,666.

The aluminogermanosilicate molecular sieve having CTH framework topology can have a molar ratio of $(SiO_2+GeO_2)/Al_2O_3$ in a range of from 35 to 500 (e.g., 50 to 150).

Step (b)

Degermanation in step (b) can be accomplished by subjecting the germanium-containing molecular sieve to treatment with water or an aqueous solution of a mineral acid. Any method known in the art for degermanating a germanium-containing molecular sieve material with water or an aqueous solution of a mineral acid can be used in the degermanation of the present disclosure.

The mineral acid concentration in the aqueous solution can be 0.50 M or less (e.g., 0.001 to 0.50 M, 0.005 to 0.50 M, 0.01 to 0.50 M, 0.001 to 0.15 M, 0.005 to 0.15 M, 0.01 to 0.15 M). Suitable mineral acids include hydrochloric acid, sulfuric acid, nitric acid, and phosphoric acid. Oxalic acid and other strong organic acids may also be employed in lieu of mineral acids.

Suitable degermanation conditions can include a temperature of from 15° C. to 200° C. (e.g., 15° C. to 150° C., 15° C. to 100° C., 15° C. to 50° C., 15° C. to 35° C., 50° C. to 200° C., 50° C. to 150° C., 50° C. to 100° C., 75° C. to 200° C., 75° C. to 150° C., or 75° C. to 125° C.). During the degermanation, the molecular sieve can be treated at two or more different temperatures.

The degermanation can be carried out for a period of from 0.1 to 120 hours (e.g., 4 to 48 hours, 12 to 36 hours, or 18 to 30 hours).

The weight ratio of water or aqueous solution of a mineral acid relative to the aluminogermanosilicate molecular sieve of CTH framework topology during degermanation can range from 1:1 to 500:1 (e.g., 2:1 to 500:1, 2:1 to 250:1, 2:1 to 100:1, 2:1 to 50:1, 2:1 to 25:1, 2:1 to 10:1, 5:1 to 500:1, 5:1 to 250:1, 5:1 to 100:1, 5:1 to 50:1, 5:1 to 25:1, or 5:1 to 10:1).

After degermanation, the obtained degermanated molecular sieve can be separated from the suspension and recovered by any conventional method (e.g., filtration, centrifugation). The separated degermanated molecular sieve can be subjected to a washing step with a washing agent at a temperature below 100° C. and/or drying. Suitable washing agents include water and alcohols such as methanol, ethanol, and propanol. Drying can be carried out at a temperature of from 75° C. to 200° C. (e.g., 85° C. to 180° C., or 95° C. to 150° C.) for a period of from 1 to 100 hours (e.g., 6 to 36 hours).

Without being bound by any theory, it is believed that germanium bonds, such as Si—O—Ge or Ge—O—Ge, are selectively hydrolyzed resulting in at least partial disassembly of the framework structure of the aluminogermanosilicate molecular sieve provided in step (a).

Step (c)

After step (b), preferably after washing or after drying, more preferably after washing and drying, the degermanated molecular sieve is subjected to calcination to convert the degermanated molecular sieve to aluminogermanosilicate molecular sieve SSZ-114. No specific restrictions exist concerning calcination conditions.

The calcination can be carried out at a temperature of from 400° C. to 700° C. (e.g., 450° C. to 650° C., or 500° C. to 600° C.).

The calcination is generally carried out for 0.25 hours or more (e.g., 1 to 10 hours, 2 to 8 hours, or 3 to 6 hours).

Calcination can occur under any suitable gas atmosphere such as nitrogen, air or lean air.

Calcination can be carried out in a muffle furnace, rotary furnace and/or a belt calcination furnace.

Without being bound by theory, it is believed that calcination promotes reassembly of the degermanated molecular sieve into a new three-dimensional framework molecular sieve material, designated herein as SSZ-114.

The SSZ-114 material can contain some exchangeable or charge balancing cations in its pores. These exchangeable cations can be exchanged for other cations. Replacing cations can include metal ions, hydrogen ions, hydrogen precursor (e.g., ammonium) ions and mixtures thereof. Preferred replacing cations are those which tailor the catalytic activity for certain organic conversion reactions. These include hydrogen, rare earth metals and metals of Groups 2 to 15 of the Periodic Table of the Elements.

Characterization of the Molecular Sieve

In its calcined form, the molecular sieve SSZ-114 can have a chemical composition, in terms of molar ratios, within the ranges set forth in Table 1:

TABLE 1

|  | Broadest | Secondary |
|---|---|---|
| $SiO_2/Al_2O_3$ | ≥10 | 50 to 5000 |
| $SiO_2/GeO_2$ | 20 to 100 | 25 to 50 |

SSZ-114 has a powder X-ray diffraction pattern as shown in FIG. 1.

The powder X-ray diffraction patterns presented herein were collected by standard techniques. The radiation was CuKα radiation. The peak heights and the positions, as a function of 2-theta where theta is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation, if any. Calcination can also cause minor shifts in the XRD pattern. Notwithstanding these minor perturbations, the basic crystal lattice structure remains unchanged.

Sorption and Catalysis

Molecular sieve SSZ-114 can be used as a sorbent or as a catalyst to catalyze a wide variety of organic compound conversion processes including many of present commercial/industrial importance. Examples of chemical conversion processes which are effectively catalyzed by SSZ-114, by itself or in combination with one or more other catalytically active substances including other crystalline catalysts, include those requiring a catalyst with acid activity. Organic conversion processes which may be catalyzed by SSZ-114 include, for example, cracking, hydrocracking, disproportionation, alkylation, oligomerization, and isomerization.

As in the case of many catalysts, it may be desirable to incorporate SSZ-114 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-114 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-114 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-114 also include inorganic oxides, such as silica, zirconia, titania, magnesia, beryllia, alumina, and mixtures thereof.

In addition to the foregoing materials, SSZ-114 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-114 and inorganic oxide matrix may vary widely, with the SSZ-114 content ranging from 1 to 90 wt. % (e.g., 2 to 80 wt. %) of the composite.

EXAMPLES

The following illustrative examples are intended to be non-limiting.

Example 1

Synthesis of SSZ-114

A suspension of 0.1 g of calcined aluminogermanosilicate CIT-13, prepared as described in U.S. Pat. No. 10,155,666, in deionized water (25 mL) was heated at 95° C. for 24 hours. The solids were then recovered by centrifugation and dried in a vacuum oven at room temperature.

The dried molecular sieve product was calcined inside a muffle furnace under a flow of air heated to 540° C. at a rate of 1° C./minute and held at 540° C. for 5 hours, cooled and then analyzed by powder XRD.

Powder XRD of the product gave the pattern indicated in FIG. 1 and showed the product to be a pure form of a new molecular sieve phase, designated SSZ-114.

The chemical and physical properties of the molecular sieve product are summarized in Table 2.

TABLE 2

| | |
|---|---|
| SiO$_2$/Al$_2$O$_3$ molar ratio | 89 |
| SiO$_2$/GeO$_2$ molar ratio | 42 |
| Micropore Volume (t-plot with Ar), cm$^3$/g | 0.057 |
| Micropore Volume (DFT with Ar), cm$^3$/g | 0.024 |
| Surface Area (DFT with Ar), m$^2$/g | 171 |
| Pore Width (DFT with Ar), Å | 540 |
| Brønsted Acidity, µmol/g | 90 |

Example 2

Constraint Index Determination

Material from Example 1 was converted to the [NH$_4$]$^+$ form of SSZ-114 by heating the material in an aqueous solution of NH$_4$NO$_3$ (typically, 1 g of NH$_4$NO$_3$/1 g of molecular sieve in 20 mL of H$_2$O) at 95° C. for 2-3 hours. The mixture was then filtered and the step was repeated as many times as desired (usually 2-3 times). After filtration, the obtained [NH$_4$]$^+$-exchanged product was washed with deionized water and air dried. The [NH$_4$]$^+$ form of SSZ-114 was converted to the H$^+$ form by calcination to 540° C.

The H$^+$ form of SSZ-114 was pelletized at 4 kpsi, crushed and granulated to 20-40 mesh. A 0.6 g sample of the granulated material was calcined in air at 540° C. for 4 hours and cooled in a desiccator to ensure dryness. Then, 0.5 g of material was packed into a ¼-inch stainless steel tube with alundum on both sides of the molecular sieve bed. A furnace (Applied Test Systems, Inc.) was used to heat the reactor tube. Nitrogen was introduced into the reactor tube at 9.4 mL/min and at atmospheric pressure. The reactor was heated to about 427° C. (800° F.), and a 50/50 feed of n-hexane and 3-methylpentane was introduced into the reactor at a rate of 8 µL/min. The feed was delivered by an ISCO pump. Direct sampling into a GC began after 15 minutes of feed introduction.

The Constraint Index value (excluding 2-methylpentane) was calculated from the GC data using methods known in the art and was 0.44-0.49 for times on stream from 0-149 minutes. Feed conversion was 63% at 0 minutes and 427° C. and 35% at 149 minutes and 427° C.

Example 3

Catalyst Preparation

Material from Example 1 was ion-exchanged with an aqueous (NH$_3$)$_4$Pt(NO$_3$)$_2$ solution at a pH of about 10 such that 1 g of this solution mixed in with 1 g of zeolite provided a Pt loading of 0.5 wt. %. The recovered Pt/SSZ-114 catalyst was washed with deionized water to a conductivity of less than 50 µS/cm, dried at 95° C., and then calcined in air at 371° C. for 3 hours. The calcined Pt/SSZ-114 catalyst was then pelletized, crushed, and sieved to 20-40 mesh.

Example 4

Hydroconversion of n-Decane 0.5 g of the Pt/SSZ-114 catalyst from Example 3 was loaded in the center of a 23-inch long×0.25-inch outside diameter stainless steel reactor tube with catalytically inert alundum loaded upstream of the catalyst for preheating the feed (a total pressure of 1200 psig; a down-flow hydrogen rate of 12.5 mL/min when measured at 1 atmosphere pressure and 25° C.; and a down-flow liquid feed rate of 1 mL/hour for n-decane). All materials were first reduced in flowing hydrogen at about 315° C. for 1 hour. The reaction was carried out between 315° C. and 370° C. Products were analyzed by on-line capillary gas chromatography (GC) once every 60 minutes. Raw data from the GC was collected by an automated data collection/processing system and hydrocarbon conversions were calculated from the raw data. Conversion is defined as the amount n-decane reacted to produce other hydrocarbon products (e.g., cracking products and iso-C$_{10}$ products). Yields are expressed as mole percent of products other than n-decane and include iso-C$_{10}$ isomers as a yield product. The results are shown in Table 3.

TABLE 3

| Conditions | |
|---|---|
| Temperature, ° C. | 366 |
| Pressure, psig | 1200 |
| Catalyst Loading, g | 0.5 |
| n-Decane rate, mL/h | 1.0 |
| H$_2$ Rate, mL/h | 12.5 |
| Results | |
| n-Decane Conversion, mol % | 90.8 |
| Cracking Yield, mol % | 62.4 |
| Iso-C$_{10}$ Yield | 28.4 |
| Methylnonane Distribution | |
| 2-Methylnonane | 26.1 |
| 3-Methylnonane | 32.3 |
| 4-Methylnonane | 27.6 |
| 5-Methylnonane | 14.0 |

Examples 5-11

Example 1 was repeated except that the aluminogermanosilicate CIT-13 molecular sieve starting material was degermanated under the conditions set forth in Table 4.

TABLE 4

| | Solvent | Acid Concentration, (mol/L) | Treatment Time (h) | Treatment Temperature (° C.) |
|---|---|---|---|---|
| Example 5 | H$_2$O | — | 24 | 95 |
| Example 6 | H$_2$O | — | 24 | 25 |
| Example 7 | H$_2$O | — | 18 | 25 |
| Example 8 | H$_2$O | — | 6 | 25 |
| Example 9 | Aqueous HCl | 0.01 | 24 | 95 |
| Example 10 | Aqueous HCl | 0.05 | 24 | 95 |
| Example 11 | Aqueous HCl | 0.1 | 24 | 95 |

The product, after calcination, in each of Examples 5-11 had a powder XRD pattern consistent with that shown in FIG. 1.

The chemical and physical properties of the molecular sieve products in Examples 10-11 are summarized in Table 5.

TABLE 5

| | Example 10 | Example 11 |
|---|---|---|
| SiO$_2$/Al$_2$O$_3$ molar ratio | 327 | 791 |
| SiO$_2$/GeO$_2$ molar ratio | 39 | 38 |
| Micropore Volume (t-plot with Ar), cm$^3$/g | | 0.051 |
| Micropore Volume (DET with Ar), cm$^3$/g | | 0.019 |
| Surface Area (DFT with Ar), m$^2$/g | | 194 |
| Pore Width (DFT with Ar), Å | | 540 |
| Brønsted Acidity, µmol/g | | 20 |

The invention claimed is:

1. An aluminogermanosilicate molecular sieve having, in its calcined form, a powder X-ray diffraction pattern shown in FIG. 1;
    wherein the aluminogermanosilicate molecular sieve has a composition, in terms of molar ratios, as follows:

| | |
|---|---|
| $SiO_2/Al_2O_3$ | 50 to 5000 |
| $SiO_2/GeO_2$ | 25 to 50. |

2. A method of synthesizing the aluminogermanosilicate molecular sieve of claim 1, the method comprising:
    (a) providing a first aluminogermanosilicate molecular sieve, the first aluminogermanosilicate molecular sieve having a CTH framework topology;
    (b) treating the first aluminogermanosilicate molecular sieve with water under conditions sufficient to degermanate at least a portion of the first aluminogermanosilicate molecular sieve to form a degermanated molecular sieve; and
    (c) calcining the degermanated molecular sieve under conditions sufficient to convert the degermanated molecular sieve to a second aluminogermanosilicate molecular sieve, the second aluminogermanosilicate molecular sieve having, in its calcined form, a powder X-ray diffraction pattern as shown in FIG. 1.

3. The method of claim 2, wherein the treating according to (b) is carried out at a temperature of from 15° C. to 200° C.

4. The method of claim 2, wherein the treating according to (b) is carried out at a temperature of from 15° C. to 50° C.

5. The method of claim 2, wherein the treating according to (b) is carried out for a period of from 12 to 36 hours.

6. The method of claim 2, wherein a weight ratio of water to the first aluminogermanosilicate molecular sieve is in a range of from 1:1 to 500:1.

7. The method of claim 2, wherein the calcining according to (c) is carried out at a temperature of from 400° C. to 700° C.

8. The method of claim 2, wherein the calcining according to (c) is carried out for a period of from 1 to 10 hours.

9. A process for converting a feedstock comprising an organic compound to a conversion product, the process comprising contacting the feedstock at organic compound conversion conditions with a catalyst comprising the aluminogermanosilicate molecular sieve of claim 1.

* * * * *